March 23, 1954     E. C. FROST     2,673,051
PARACHUTE MEANS FOR LANDING AIRCRAFT
Filed May 22, 1951     2 Sheets-Sheet 1
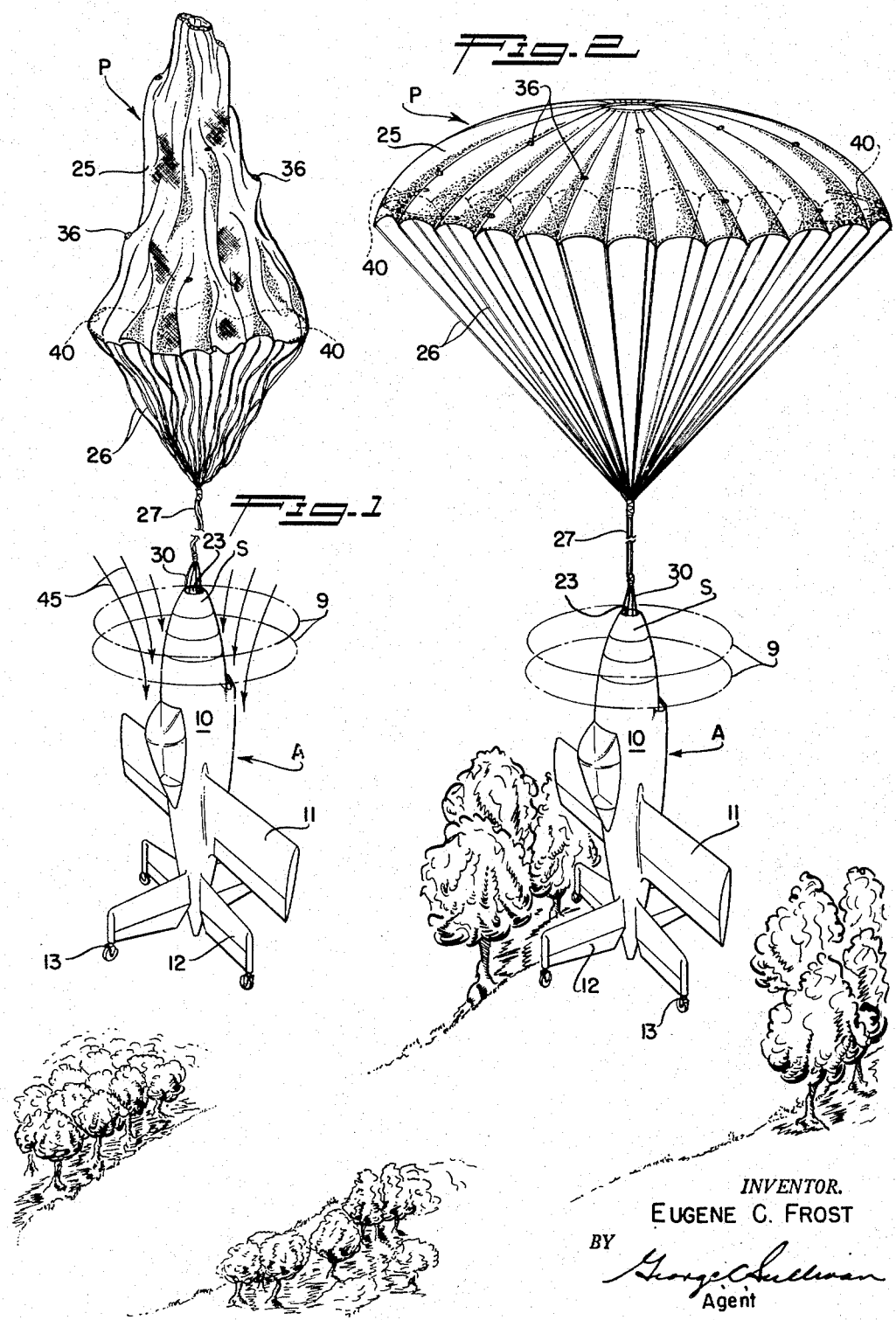
INVENTOR.
EUGENE C. FROST
BY
Agent March 23, 1954
E. C. FROST
2,673,051
PARACHUTE MEANS FOR LANDING AIRCRAFT
Filed May 22, 1951
2 Sheets-Sheet 2
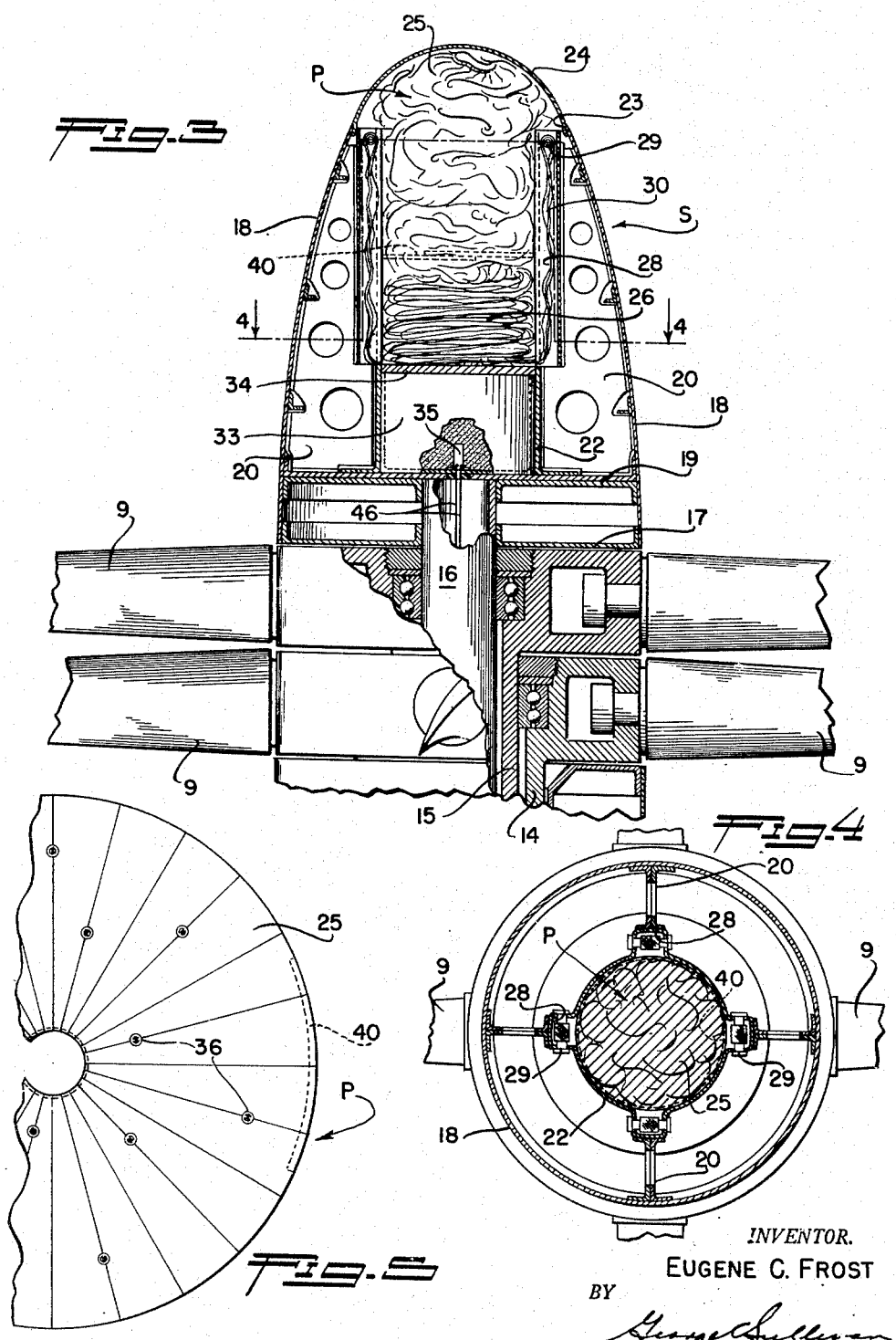
INVENTOR.
EUGENE C. FROST
BY
George Sullivan
Agent Patented Mar. 23, 1954

2,673,051

UNITED STATES PATENT OFFICE 2,673,051

PARACHUTE MEANS FOR LANDING AIRCRAFT

Eugene C. Frost, Burbank, Calif., assignor to Lockheed Aircraft Corporation, Burbank, Calif.

Application May 22, 1951, Serial No. 227,675

4 Claims. (Cl. 244—139)

This invention relates to safety equipment for aircraft and relates more particularly to apparatus for landing vertical rising and descending type airplanes in the event of engine failure or other malfunctioning.

While the apparatus of the present invention is applicable to airborne craft of various types, it is especially well adapted to airplanes designed to take off vertically, or substantially vertically, in a tail-down attitude, and to land or descend vertically in the same attitude. Such an airplane may be driven by propellers operated by turbo engines, or the like, and the power rating is such that the airplane is capable of hovering and of rising and descending slowly in a vertical tail-down attitude. In fact, in preparing for a landing the airplane is maneuvered from a normal flight attitude to the vertical tail-down attitude and is then caused to sink or move downwardly in this vertical attitude to land on its tail. There is some hazard in operating the aircraft in this manner because engine failure or malfunctioning while in the vertical attitude shortly after the take off or preparatory to landing may occur at an altitude insufficient to permit the pilot to maneuver the craft into a safe glide or otherwise bring the airplane down safely. The present invention finds one important application or use in safely landing or lowering such airplanes under these and similar circumstances.

It is, therefore, a general object of the present invention to provide a practical, dependable means for safely landing aircraft of the vertical rising type from relatively low altitudes.

Another object of the invention is to provide apparatus of this class incorporating a parachute normally stowed in the forward end of the airplane, and more specifically in the nose or propeller spinner, and ejectable upwardly therefrom to inflate above the vertically positioned tail-down airplane.

Another object of the invention is to provide apparatus of the character mentioned incorporating provisions for insuring the ejection of the parachute to a position above and free of the influence of any residual inflow of air through the propellers, which inflow might interfere with the full correct inflation of the parachute.

A further object of the invention is to provide this type of apparatus having novel means for effecting a very rapid inflation of the parachute immediately after its ejection from the airplane. I provide means for explosively and forcibly ejecting the parachute upwardly, means on the parachute for elongating or extending the parachute upwardly as it is ejected, and means associated with the parachute for spreading the lower edge of its skirt so as to be immediately "ballooned out" or inflated as a result of the relative airflow accompanying downward motion of the airplane. The upward elongation or "stretching out" of the parachute and the opening out or spreading of its lower edge assure the rapid and positive opening and full inflation of the parachute.

A still further object of the invention is to provide a safety apparatus of this class in which the parachute, its riser and shrouds, and the means for ejecting the parachute are stowed or contained in the propeller spinner structure in a simple effective manner so that they in no way interfere with the normal operation of the propellers or other elements of the airplane.

Other objectives and features will become apparent from the following detailed description of a typical preferred form of the invention throughout which reference will be made to the accompanying drawings wherein:

Figure 1 is a perspective view of an airplane equipped with the safety apparatus of the invention showing the parachute immediately after being ejected from the spinner;

Figure 2 is a view similar to Figure 1 illustrating the parachute in its inflated condition;

Figure 3 is an enlarged longitudinal sectional view of the spinner region of the airplane showing the parachute in its stowed or packed condition;

Figure 4 is a transverse sectional view taken on line 4—4 on Figure 3; and

Figure 5 is a fragmentary plan view of the inflated parachute canopy.

As indicated above, the present invention is capable of application of airborne craft of various kinds and, of course, may be designed or modified for use on airplanes of given types, etc. In the drawings, I have shown the invention associated with an airplane A intended to rise vertically in a vertical tail-down attitude during take off and to descend vertically in the same attitude during landing. The airplane includes a fuselage 10, wings 11, and tail surfaces 12. Landing gear 13 are provided on the tail or empennage to facilitate landing of the airplane A and its ground handling. The forward end of the fuselage 10 is equipped with counter-rotating propellers 9 of substantial diameter driven by powerplant means not shown. The shafts 14 and 15 for the propellers 9 are telescoping or arranged one within the other while a stationary or nonrotating shaft 16 continues forwardly beyond the inner shaft 15. A suitably shaped nose or spinner S is mounted on this stationary shaft 16. In the particular case illustrated the spinner S includes a rear bulkhead 17 fixed to the shaft 16 and a conoidal skin 18 extending upwardly or forwardly from the bulkhead. There is a second or outer bulkhead 19 secured to the shaft 16 and spaced fore and aft beams 20 are provided for carrying the skin 18 and for reinforcing the spinner. It will be apparent that the spinner may be designed and constructed in other manners and the invention is not to be construed as limited to these particular details of construction.

It is to be understood that while I have referred to the part S as a spinner, which is in accordance with the generally accepted practice in the art, the part may also be appropriately termed the nose of the airplane and the designations "spinner" and "nose" will be employed synonymously herein.

In accordance with the invention there is provided within the streamlined nose or spinner S a space, cavity, or container for a parachute P. In the particular form of the invention illustrated this container is in the nature of a cylinder 22 arranged coaxially in the spinner. The inner or rear end of the cylinder 22 is secured to the bulkhead 19 while the outer end of the cylinder may be secured or anchored at the skin 18. The outer or forward end of the cylinder 22 is open to be in alignment with a central opening 23 in the forward end of the spinner S. This opening 23 in the spinner is normally or initially closed by a dome-like cap or cover 24 which is shaped to complete the streamlined configuration of the spinner skin 18. The cover 24 is detachably retained in place in any appropriate manner. In the case illustrated the marginal portion of the cover 24 snaps into the opening 23 in such a manner that the cover may be displaced forwardly or outwardly by internal pressure.

The parachute P, which is best illustrated in the inflated condition in Figure 2, includes a suitable fabric canopy 25, shrouds 26 secured to the hem or edge of the canopy, and a riser 27 for extending downwardly from the grouped shrouds. The canopy 25, shrouds 26, and riser 27 are suitably closely packed in the cylinder 22 in such a manner that they may be bodily projected or ejected forwardly from the cylinder. Means is provided to anchor or secure the riser 27 to the airplane. I have shown the wall of the cylinder 22 provided with spaced longitudinally extending grooves or channels 28 and with anchor or attachment fittings 29 at the outer ends of the channels. Anchor lines 30 are secured to the riser 27 and are trained outwardly through the channels 28 to be attached or anchored at the fittings 29. As best illustrated in Figure 3, the shrouds 26 and riser 27 are stowed or packed in the inner portion of the cylinder 22 while the folded canopy 25 occupies the major outer portion of the cylinder. It will be observed that with the arrangement illustrated the parachute P may be forcibly ejected from the cylinder 22 without danger of shearing off, breaking, or fouling the shrouds 26, riser 27 or lines 30.

The invention further includes remotely controllable means for forcibly ejecting the parachute P from the nose or spinner S. While it is contemplated that other means may be employed, I have shown an explosive powder charge 33 arranged in the rear or inner portion of the cylinder 22 behind the parachute for ejecting the same. This portion of the cylinder 22 is preferably plain, the channels 28 terminating above or outwardly from the explosive charge 33. A slidable or ejectable plunger or disc 34 of metal, or the like, is arranged in the cylinder 22 at the forward side of the explosive charge 33 to separate the parachute from the charge and to distribute the explosive force across the end face of the packed or stowed parachute. An electrical igniter 35 is provided to ignite the charge 33 and has energizing leads 46 that may be controlled from the cabin or cockpit to fire the charge.

In the event of engine failure, or the like, during landing or shortly after taking off, the propellers 9 may continue to rotate sufficiently to cause a substantial residual down flow of air, as indicated by the arrows 45 in Figure 1. The invention provides spaced or distributed weights 36 sewed or otherwise secured on the canopy 25 of the parachute P which assure the projection of the parachute upwardly beyond this airflow when the parachute is ejected by the explosive charge 33. The momentum of the weights 36, which of course are ejected with the parachute, carry the canopy 25 well above the propellers 9 and therefore free of the influence of the down flow of air 35. The weights 36 also serve to elongate or straighten out the canopy 25 as it rises upon firing of the charge 33 to thereby condition the canopy for immediate inflation.

The invention also includes means for providing an initial partial opening of the parachute canopy immediately upon ejection of the parachute from the nose or spinner S. This latter means includes one or more strips or members 40 of spring steel, or other resilient material, secured at or in the margin or hem of the canopy 25. The members 40 are elongate parts that are sprung or bent to conform with the wall of the cylinder 22 when the parachute P is stowed in the cylinder. The flexed resilient members 40 of course tend to straighten out when released from their confinement in the cylinder 22 and upon ejection of the parachute from the spinner S the members 40 spring outwardly to curvatures of much larger radii than the cylinder 22. As best illustrated in Figure 1, this action of the members 40 spreads or opens the lower end of the canopy 25 to condition the same to receive air and thus quickly inflate as a result of the relative airflow accompanying dropping or downward travel of the airplane and parachute.

From the foregoing detailed description it will be seen that I have provided a simple, practical and dependable safety means for lowering an airplane of the vertical rising and descending type in the event of engine failure or other malfunctioning when the airplane is in the critical altitude where other measures of bringing the airplane down in safety may not be practical or feasible. It will be observed that the parachute P and its associated equipment housed or packed in the nose or spinner S do not necessitate any alteration in the basic airplane construction or in the airplane configuration and do not in any way interfere with normal airplane operation. If it becomes necessary to employ the parachute P the circuit to the igniter 35 is closed to fire the charge 33. The resultant explosive force drives the parachute P upwardly from the spinner S dislodging the cap or cover 24 and ejecting the parachute canopy 25 to a position well above the propellers 9, the weights 36 materially assisting in carrying the canopy to a position clear of the downflow 45 of air through the propellers 9. Immediately upon ejection of the parachute the members 40 spring outwardly to open or partially open the lower portion of the parachute canopy 25 to be in a condition to receive air for inflating the parachute. Thus the parachute is capable of inflation almost immediately upon ejection from the airplane and is adapted to lower the airplane at a sufficiently low sinking speed to prevent serious injury to the airplane and pilot under most conditions of operation.

Having described only a typical form of the invention I do not wish to be limited to the specific details herein set forth, but wish to reserve to myself any variations or modifications that may appear to those skilled in the art and fall within the scope of the following claims.

I claim:

1. In an airplane capable of horizontal flight and of descending and ascending in a vertical tail-down attitude and having a propeller on its forward end the combination of a stationary nose projecting forwardly beyond the propeller, the nose having a cavity, a parachute stowed in the cavity including a canopy and shrouds, line means stowed in the cavity securing the shrouds to the airplane, means for forcibly ejecting the parachute from the cavity to a region above and clear of the airflow through the propeller when the airplane is in said vertical attitude, and means for spreading the margin of the canopy when the parachute is ejected comprising a resilient element confined in curved position when the parachute is in the cavity and tending to straighten by its resilience when freed from the cavity.

2. In an airplane capable of horizontal flight and of descending and ascending in a vertical tail-down attitude and having a propeller on its forward end; a relatively stationary spinner in front of the propeller, a parachute packed in the spinner, line means attaching the parachute to the airplane and packed in the spinner, and explosive means for ejecting the parachute upwardly from the spinner and clear of air inflow through the propeller when the airplane is in the vertical attitude, the explosive means including an explosive charge behind the parachute, and an igniter for the charge.

3. Safety means for lowering an airplane having a nose with propulsive propeller means thereon, the nose protruding forwardly beyond the propeller means and having a central forward opening, said safety means including a cylinder in said opening, a parachute packed in the cylinder, line means for anchoring the parachute to the nose, explosive means for ejecting the parachute from the cylinder and nose, resilient members secured along the margin of the parachute and confined in curved positions by the cylinder, the members serving to straighten by their resiliency upon ejection of the parachute to open the parachute, and at least one weight on the parachute for carrying the parachute beyond the influence of the airflow through the propeller means upon ejection of the parachute.

4. Safety means for lowering an airplane having a non-rotatable nose with propulsive propeller means thereon, the nose protruding forwardly beyond the propeller means and having a central forward opening, said safety means including a cylinder in said opening, a parachute packed in the cylinder, line means for anchoring the parachute to the nose, the parachute including an inflatable canopy, explosive means for ejecting the parachute from the cylinder and nose, and weights secured to the canopy at spaced points thereon for carrying the canopy clear of the airflow through the propeller when the canopy is ejected.

EUGENE C. FROST.

References Cited in the file of this patent

UNITED STATES PATENTS

| Number | Name | Date |
|---|---|---|
| 1,019,858 | Tanner | Mar. 12, 1912 |
| 1,023,233 | Williams | Apr. 16, 1912 |
| 1,138,140 | Oister | May 4, 1915 |
| 1,341,794 | El Vean | June 1, 1920 |
| 2,328,786 | Crowder | Sept. 7, 1943 |
| 2,440,003 | Bowlus | Apr. 20, 1948 |
| 2,549,407 | Apostolescu | Apr. 17, 1951 |

FOREIGN PATENTS

| Number | Country | Date |
|---|---|---|
| 432,059 | France | Sept. 27, 1911 |